(12) United States Patent
Kuranoshita

(10) Patent No.: US 8,656,278 B2
(45) Date of Patent: Feb. 18, 2014

(54) DATA CONVERTING APPARATUS AND DATA CONVERTING PROGRAM

(75) Inventor: Masashi Kuranoshita, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 868 days.

(21) Appl. No.: 12/434,061

(22) Filed: May 1, 2009

(65) Prior Publication Data

US 2009/0300479 A1    Dec. 3, 2009

(30) Foreign Application Priority Data

May 27, 2008   (JP) ................................. 2008-138418

(51) Int. Cl.
*G06F 17/00* (2006.01)
*G06F 3/048* (2013.01)

(52) U.S. Cl.
USPC ........... 715/274; 715/200; 715/234; 715/273; 715/275; 715/276; 358/448

(58) Field of Classification Search
USPC ......... 715/274, 235, 239, 255, 273, 275, 276; 358/448, 1.1, 1.15, 1.16
See application file for complete search history.

(56) References Cited

U.S. PATENT DOCUMENTS

| | | | | |
|---|---|---|---|---|
| 6,883,140 B1* | 4/2005 | Acker et al. | .................. | 715/730 |
| 7,574,673 B2* | 8/2009 | Umeda | .......................... | 715/838 |
| 8,064,096 B2* | 11/2011 | Waara | ............................ | 358/1.5 |
| 8,089,653 B2 | 1/2012 | Kobashi | | |
| 2002/0059278 A1* | 5/2002 | Bailey et al. | .................. | 707/100 |
| 2002/0126149 A1* | 9/2002 | Umeda | .......................... | 345/769 |
| 2003/0035138 A1* | 2/2003 | Schilling | ...................... | 358/1.15 |
| 2003/0079030 A1* | 4/2003 | Cocotis et al. | ................. | 709/229 |
| 2004/0070784 A1* | 4/2004 | Shannon | ....................... | 358/1.15 |
| 2004/0136033 A1* | 7/2004 | Glaspy et al. | ................. | 358/1.18 |
| 2005/0005061 A1* | 1/2005 | Robins | .......................... | 711/104 |
| 2005/0044494 A1* | 2/2005 | Barnes et al. | ................. | 715/531 |
| 2005/0063010 A1* | 3/2005 | Giannetti | ...................... | 358/1.18 |

(Continued)

FOREIGN PATENT DOCUMENTS

| | | |
|---|---|---|
| JP | 2002-55801 | 2/2002 |
| JP | 2003-316549 | 11/2003 |

(Continued)

OTHER PUBLICATIONS

Japanese Patent Application 2005-028018 (JPO1), which was the application associated with Laid-open patent Publication No. 2006-215819 (translation as provided by AIPN at http://dossier1.ipdl.inpit.go.jp/AIPN/odse_top_dn.ipdl?N0000=7400).*

(Continued)

*Primary Examiner* — William Bashore
*Assistant Examiner* — Nathan Shrewsbury
(74) *Attorney, Agent, or Firm* — Young & Thompson

(57) ABSTRACT

A data converting apparatus includes: a display image producing section that receives a file including one or more records in each of which records print data for one or more pages is described so as to produce image data for displaying; a preview displaying section that displays an image based on the image data produced in the display image producing section, and receives a designation by a user operation as to whether or not printing on a record basis or on a page basis is required; and a print image producing section that produces image data for printing with respect to the record or page which is designated to be printed by the preview displaying section.

6 Claims, 13 Drawing Sheets

(56) References Cited

U.S. PATENT DOCUMENTS

| | | | |
|---|---|---|---|
| 2005/0094207 A1* | 5/2005 | Lo et al. | 358/1.18 |
| 2005/0125724 A1* | 6/2005 | Peiro et al. | 715/517 |
| 2005/0125728 A1* | 6/2005 | Peiro et al. | 715/523 |
| 2006/0023238 A1* | 2/2006 | Blaszyk et al. | 358/1.13 |
| 2006/0061823 A1* | 3/2006 | Riesel et al. | 358/1.16 |
| 2006/0168514 A1* | 7/2006 | Tokunaga | 715/513 |
| 2006/0170944 A1* | 8/2006 | Arps et al. | 358/1.13 |
| 2006/0170948 A1 | 8/2006 | Kobashi | |
| 2006/0221358 A1* | 10/2006 | Takahashi | 358/1.1 |
| 2007/0024907 A1* | 2/2007 | Henke et al. | 358/1.18 |
| 2007/0182985 A1* | 8/2007 | Ciriza et al. | 358/1.15 |
| 2007/0201048 A1* | 8/2007 | DuBois | 358/1.1 |
| 2007/0268519 A1* | 11/2007 | Appercel et al. | 358/1.15 |
| 2008/0024807 A1* | 1/2008 | Matsuda | 358/1.12 |
| 2008/0137126 A1* | 6/2008 | Yoshida | 358/1.14 |
| 2008/0180701 A1* | 7/2008 | Nakagiri et al. | 358/1.9 |
| 2008/0186537 A1* | 8/2008 | Isobe | 358/1.15 |
| 2008/0204809 A1* | 8/2008 | Miyashita et al. | 358/1.18 |
| 2008/0278770 A1* | 11/2008 | Sakuramata et al. | 358/448 |
| 2008/0309971 A1* | 12/2008 | Nishikawa | 358/1.15 |
| 2009/0128613 A1* | 5/2009 | Bouchard et al. | 347/171 |
| 2009/0185214 A1* | 7/2009 | Bellert et al. | 358/1.15 |
| 2009/0201528 A1* | 8/2009 | Truong | 358/1.15 |
| 2009/0225343 A1* | 9/2009 | Tominaga | 358/1.9 |
| 2009/0241024 A1* | 9/2009 | Shiohara | 715/274 |
| 2009/0244610 A1* | 10/2009 | Mizutani et al. | 358/1.15 |
| 2009/0279120 A1* | 11/2009 | Gerega | 358/1.15 |
| 2010/0313123 A1* | 12/2010 | Tomomatsu | 715/274 |
| 2011/0096361 A1* | 4/2011 | Aoki et al. | 358/1.15 |

FOREIGN PATENT DOCUMENTS

| | | |
|---|---|---|
| JP | 2005-208925 | 8/2005 |
| JP | 2006-215819 | 8/2006 |
| JP | 2006-338569 | 12/2006 |

OTHER PUBLICATIONS

Notice of Reasons for Refusal issued Oct. 30, 2012 by the Japanese Patent Office in corresponding Japanese Patent Application No. 2008-138418 with English translation.

* cited by examiner

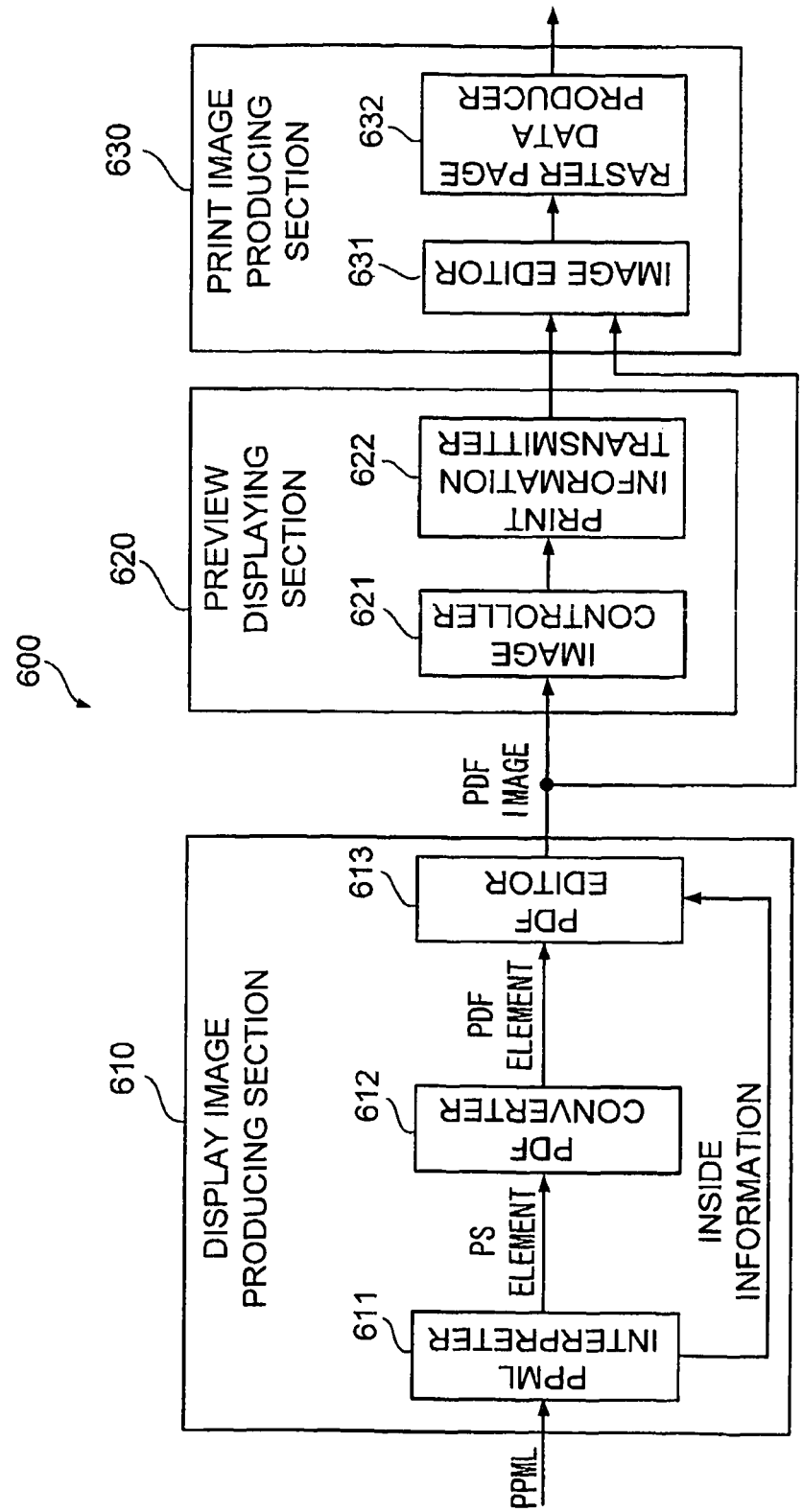

FIG. 8

```
 1: <PPML>
 2:         ⎡ <REUSABLE_OBJECT>
 3:         ⎢     <OBJECT Position="0 0">
 4:         ⎢         <SOURCE Format="application/pdf">
 5:         ⎢             <EXTERNAL_DATA_ARRAY Src="Reusable1.pdf" Index="1" />
 6:         ⎢         </SOURCE>
 7:         ⎢     </OBJECT>
 8:    (a) ⎨     <OCCURRENCE_LIST>
 9:         ⎢         <OCCURRENCE Name=" REUSE_00001">
10:         ⎢             <VIEW>
11:         ⎢                 <CLIP_RECT Rectangle "=0 486. 96 283 906.96" />
12:         ⎢             </VIEW>
13:         ⎢         </OCCURRENCE>
14:         ⎢     </OCCURRENCE_LIST>
15:         ⎣ </REUSABLE_OBJECT>
16:
17:         ⎡ <DOCUMENT_SET>
18:         ⎢     <DOCUMENT_Label=" Mr.A Info" PageCount=" 3">
19:         ⎢         ⎡ <PAGE>
20:         ⎢         ⎢     <PAGE_DESIGN TrimBox=" 0 0 1275 906.96" />
21:         ⎢         ⎢     <MARK Position=" 28.3465-28.3465 ">
22:         ⎢         ⎢         <OCCURRENCE_REF Ref=" REUSE_00001" />
23:         ⎢         ⎢     </MARK>
24:         ⎢         ⎢     <MARK Position=" 255. 12 42. 244">
25:         ⎢         ⎢         <VIEW>
26:         ⎢  (b-1) ⎨             <TRANSFORM Matrix="1 0 0 1 0 0"/>
27:         ⎢         ⎢         <VIEW>
28:    (b) ⎨         ⎢         <OBJECT Position=" 0 0">
29:         ⎢         ⎢             <SOURCE Format=" image/jpeg">
30:         ⎢         ⎢                 <EXTERNAL_DATA Src="test1.jpg" />
31:         ⎢         ⎢             </SOURCE>
32:         ⎢         ⎢             <VIEW>
33:         ⎢         ⎢         </OBJECT>
34:         ⎢         ⎢     </MARK>
35:         ⎢         ⎣ </PAGE>
36:         ⎢         ⎡ <PAGE>
37:         ⎢  (b-2) ⎨     OMITTED
38:         ⎢         ⎣ </PAGE>
39:         ⎢         ⎡ <PAGE>
40:         ⎢  (b-3) ⎨     OMITTED
41:         ⎢         ⎣ </PAGE>
42:         ⎢     </DOCUMENT>
43:         ⎣ </DOCUMENT_SET>
44:         ⎡ <DOCUMENT_SET>
45:         ⎢     <DOCUMENT_Label=" Mr.B Info" PageCount=" 1">
46:         ⎢         ⎡ <PAGE>
47:    (c) ⎨  (c-1) ⎨     OMITTED
48:         ⎢         ⎣ </PAGE>
49:         ⎢     </DOCUMENT>
50:         ⎣ </DOCUMENT_SET>
51:         ⎡ <DOCUMENT_SET>
52:         ⎢     <DOCUMENT_Label=" Mr.C Info" PageCount=" 2">
53:         ⎢         ⎡ <PAGE>
54:         ⎢  (d-1) ⎨     OMITTED
55:    (d) ⎨         ⎣ </PAGE>
56:         ⎢         ⎡ <PAGE>
57:         ⎢  (d-2) ⎨     OMITTED
58:         ⎢         ⎣ </PAGE>
59:         ⎢     </DOCUMENT>
60:         ⎣ </DOCUMENT_SET>
61: </PPML>
```

DATA CONVERTING APPARATUS AND DATA CONVERTING PROGRAM

BACKGROUND OF THE INVENTION

1. Field of the Invention

The present invention relates to a data converting apparatus which converts input image data into printing image data, and then, outputs it, and a data converting program which causes an information processing apparatus to operate as the data converting apparatus.

2. Description of the Related Art

In recent years, electronization has advanced also in the field of printing to achieve greater proliferation of DTP (Desktop Publishing) in which pages of a printed matter are edited on an editing computer. In general, pages are described in a page description language such as PS (PostScript: registered trademark) or a PDF (Portable Document Format) as DTP software for use in editing the pages by an operator. Image data expressing an image of a page in which elements such as characters or photographs are definitely arranged is produced with the DTP software. The image data produced with the DTP software include element data portions expressing the elements arranged on the page, respectively, and further, descriptions of the arrangement positions of the elements on the page.

For example, in making postcards for plural destinations, there has been frequently performed variable printing for editing image data including element data which have a master element such as a stamp mark common to plural pages described therein and are used commonly, and other element data which have variable elements such as destinations different in each of the pages from each other described therein and are interchanged, and for outputting the image data. In recent years, there has been widely known a data description language of PPML (Personalized Print Markup Language) which can efficiently edit a page for such variable printing (see, for example, Japanese Patent Application Laid-open No. 2003-316549). PPML can in advance declare the common use of a master element among plural pages. In a case where a page for the variable printing is described by the use of PS or PDF, a master element commonly appearing on the plural pages needs to be described every time. In contrast, in the case of the use of the PPML, the master element first is described only once, and thus, the re-use of the master element described already can be instructed when the master element appears on the page. Therefore, the use of the PPML can reduce the total amount of image data in addition to that a page can be legibly and simply described.

Japanese Patent Application Laid-open No. 2005-208925 discloses a process for converting image data described in the PPML into printing image data.

Normally, image elements are not described not all directly in a PPML file described in PPML, and a file name in which image elements such as documents or photographs to be arranged on an image are described and the like are described in the PPML file, and further, arrangement positions of the elements on the image and the like are described in the PPML file. As a consequence, the image data is constructed by collecting all of the files of the elements based on information described in the PPML file.

More particularly, a file of each of the elements is specified by interpreting the PPML file; the specified file is converted into each of PS element data described in PS; and further, inside information expressing the arrangement position of each of the elements on the image is produced. Subsequently, the PS element data obtained in the above-described manner is converted into raster element data by rasterization. Moreover, editing is performed based on the inside information so as to arrange an image element expressed by the raster element data at a determined position on the image, thereby producing raster page data expressing an image per page.

The raster page data such produced as explained above is transmitted to a printer, which then prints an image based on the raster page data.

The PPML file has the file name and the like of the image element described directly therein, as explained above, thereby making it difficult to know the entire image per page from the PPML file. As processed in accordance with the disclosure of Japanese Patent Application Laid-open No. 2005-208925 upon receipt of the PPML file, the data is merely mechanically converted into the raster page data, and therefore, the image per page cannot be seen until the image is printed by the printer. As a consequence, in a case where there is a page which need not be printed, even such an unnecessary page is printed, thereby possibly causing wastes.

SUMMARY OF THE INVENTION

The present invention has been made in view of above circumstances and provides a data converting apparatus and a data converting program, wherein a chance of determining whether or not printing is required is given to a user after receipt of image data, and the image data is converted into printing image data excluding unnecessary page which need not to be printed.

According to the invention, a data converting apparatus includes:

a display image producing section that receives a file including one or more records in each of which records print data for one or more pages is described so as to produce image data for displaying;

a preview displaying section that displays an image based on the image data produced in the display image producing section, and receives a designation by a user operation as to whether or not printing on a record basis or on a page basis is required; and a print image producing section that produces image data for printing with respect to the record or page which is designated to be printed by the preview displaying section.

The data converting apparatus according to the present invention is provided with the preview displaying section. Therefore, the image is displayed before printing, and it can be determined as to whether or not the image need be printed per record or page, so that printing image data including only pages which need to be printed is produced, thus preventing any needless printing.

Here, in the data converting apparatus according to the invention, it is preferable that the preview displaying section includes:

an image controller that produces and displays a screen including: a list display field for displaying a list of thumbnail images based on the image data for one or more pages included in the designated record out of the image data for displaying produced in the display image producing section; an image display field for displaying an image for one page designated by the user operation from the list of thumbnail images displayed in the list display field; and an operation field for designating the record of the thumbnail images displayed in the list display field and for designating whether or not printing is required for the image of one or more pages included in the record expressed by the thumbnail image displayed in the list display field or for the image of one page displayed in the image display field, that displays the list of thumbnail images of a record newly designated in the list display field in accordance with the designation of the record by the user, and displays a new image corresponding to the newly designated thumbnail image in the image display field in accordance with a new designation of one out of the thumbnail images displayed in the list display field by the user; and a print information transmitter that transmits information on the record or page to be printed to the print image producing section upon receipt of the designation by the user as to whether or not printing on a record basis or on a page basis is required.

The above-described configuration of the preview displaying section can achieve a man-machine interface having a good usability.

In addition, in the data converting apparatus according to the invention, it is preferable that the display image producing section includes:

a PPML interpreter that receives the file described in PPML data and produces PS element data in which an element of the image is described in PS data, and inside information representing an arrangement position within a page, of the element of the image expressed by the PS element data;

a PDF converter that converts the PS element data produced in the PPML interpreter into PDF element data in which the same element as that of the image expressed in the PS element data is expressed in PDF data; and a PDF editor that edits the PDF element data obtained in the PDF converter based on the inside information produced in the PPML interpreter, and produces image data representing an image on a page basis, the image data being described in the PDF data.

The data converting apparatus disclosed in Japanese Patent Application Laid-open No. 2005-208925 produces PS element data based on a PPML file, converts the PS element data into raster element data, and then, edits the raster element data into raster page data. Raster data such as the raster element data and the raster page data is large in data amount in expressing the same image. Therefore, when an image is displayed before printing based on the raster page data, it takes much time in displaying the image or updating the display image, resulting in markedly inefficiency. In contrast, in a case where the data is converted into image data described in PDF, as explained above, the data amount in expressing the same image is sufficiently small, so that the image can be displayed or updated at a high speed, thereby remarkably enhancing workability in the preview displaying section.

Further, in the data converting apparatus according to the invention, it is preferable that the print image producing section includes:

an image editor that receives the image data described in the PDF data from the display image producing section, receives information on the record or page to be printed from the preview displaying section, and edits the data into the image data to be printed by deleting the image data not required for printing out of the image data received from display image producing section; and a raster page data producer that converts the image data edited by the image editor into raster page data being composed of raster data and representing an image on a page basis.

With the above-described configuration, based on the PDF data produced for displaying the image in the preview displaying section, the PDF image data required not to be printed can be speedily deleted whereas the PDF image data required to be printed can be speedily converted into the raster page data.

In the data converting apparatus according to the invention, the print image producing section can include;

a file editor that receives the file described in the PPML data, receives information on the record or page to be printed from the preview displaying section, and produces a new file described in the PPML data of the record or page to be printed by deleting the PPML data of the record or page not required to be printed from the file;

a second PPML interpreter that receives the new file produced by the file editor and being composed of the PPML data, and produces PS element data in which an element of the image is described in the PS data and inside information representing an arrangement position within the page, of the element of the image expressed in the PS element data;

a raster converter that converts the PS element data produced in the second PPML interpreter into raster element data in which the same element as that of the image expressed in the PS element data is expressed in raster data; and a raster data editor that edits the raster element data obtained in the raster converter based on the inside information produced in the second PPML interpreter, so as to produce raster page data representing an image on a page basis.

As disclosed in Japanese Patent Application Laid-open No. 2005-208925, it is general that the PS data has been conventionally converted into the raster data. In the case where the user has such a function, the data can be converted into the printing raster page data, as explained above, unless there is additionally provided a function of converting the PDF data into the raster data.

A computer-readable storage medium storing a data converting program according to the invention, stores the data converting program which is executed in an information processing apparatus executing a program, and which causes the information processing apparatus to operate as:

a display image producing section that receives a file including one or more records in each of which records print data for one or more pages is described so as to produce image data for displaying;

a preview displaying section that displays an image based on the image data produced in the display image producing section, and receives a designation by a user operation as to whether or not printing on a record basis or on a page basis is required; and a print image producing section that produces image data for printing with respect to the record or page which is designated to be printed by the preview displaying section Here, in the computer-readable storage medium storing a data converting program according to the invention, it is preferable that the preview displaying section includes:

an image controller that produces and displays a screen including: a list display field for displaying a list of thumbnail images based on the image data for one or more pages included in the designated record out of the image data for displaying produced in the display image producing section; an image display field for displaying an image for one page designated by the user operation from the list of thumbnail images displayed in the list display field; and an operation field for designating the record of the thumbnail images displayed in the list display field and for designating whether or not printing is required for the image of one or more pages included in the record expressed by the thumbnail image displayed in the list display field or for the image of one page displayed in the image display field, that displays the list of thumbnail images of a record newly designated in the list display field in accordance with the designation of the record by the user, and displays a new image corresponding to the newly designated thumbnail image in the image display field in accordance with a new designation of one out of the thumbnail images displayed in the list display field by the user; and a print information transmitter that transmits information on the record or page to be printed to the print image producing section upon receipt of the designation by the user as to whether or not printing on a record basis or on a page basis is required.

And it is also preferable that the display image producing section includes:

a PPML interpreter that receives the file described in PPML data and produces PS element data in which an element of the image is described in PS data, and inside information representing an arrangement position within a page, of the element of the image expressed by the PS element data;

a PDF converter that converts the PS element data produced in the PPML interpreter into PDF element data in which the same element as that of the image expressed in the PS element data is expressed in PDF data; and a PDF editor that edits the PDF element data obtained in the PDF converter based on the inside information produced in the PPML interpreter, and produces image data representing an image on a page basis, the image data being described in the PDF data.

Further, in the computer-readable storage medium storing a data converting program according to the invention, it is preferable that the print image producing section includes:

an image editor that receives the image data described in the PDF data from the display image producing section, receives information on the record or page to be printed from the preview displaying section, and edits the data into the image data to be printed by deleting the image data not required for printing out of the image data received from display image producing section; and a raster page data producer that converts the image data edited by the image editor into raster page data being composed of raster data and representing an image on a page basis.

Or, the print image producing section can include:

a file editor that receives the file described in the PPML data, receives information on the record or page to be printed from the preview displaying section, and produces a new file described in the PPML data of the record or page to be printed by deleting the PPML data of the record or page not required to be printed from the file;

a second PPML interpreter that receives the new file produced by the file editor and being composed of the PPML data, and produces PS element data in which an element of the image is described in the PS data and inside information representing an arrangement position within the page, of the element of the image expressed in the PS element data;

a raster converter that converts the PS element data produced in the second PPML interpreter into raster element data in which the same element as that of the image expressed in the PS element data is expressed in raster data; and a raster data editor that edits the raster element data obtained in the raster converter based on the inside information produced in the second PPML interpreter, so as to produce raster page data representing an image on a page basis According to the present invention, the image is displayed before printing, and whether or not printing is required is designated, thus avoiding any waste printing.

BRIEF DESCRIPTION OF THE DRAWINGS

FIG. 7 is a functional block diagram illustrating an outline of a data converting apparatus as a first embodiment according to the present invention.

FIG. 8 exemplifies a PPML file.

DETAILED DESCRIPTION

Preferred embodiments according to the present invention will be described with reference to the drawings.

Figure 1:
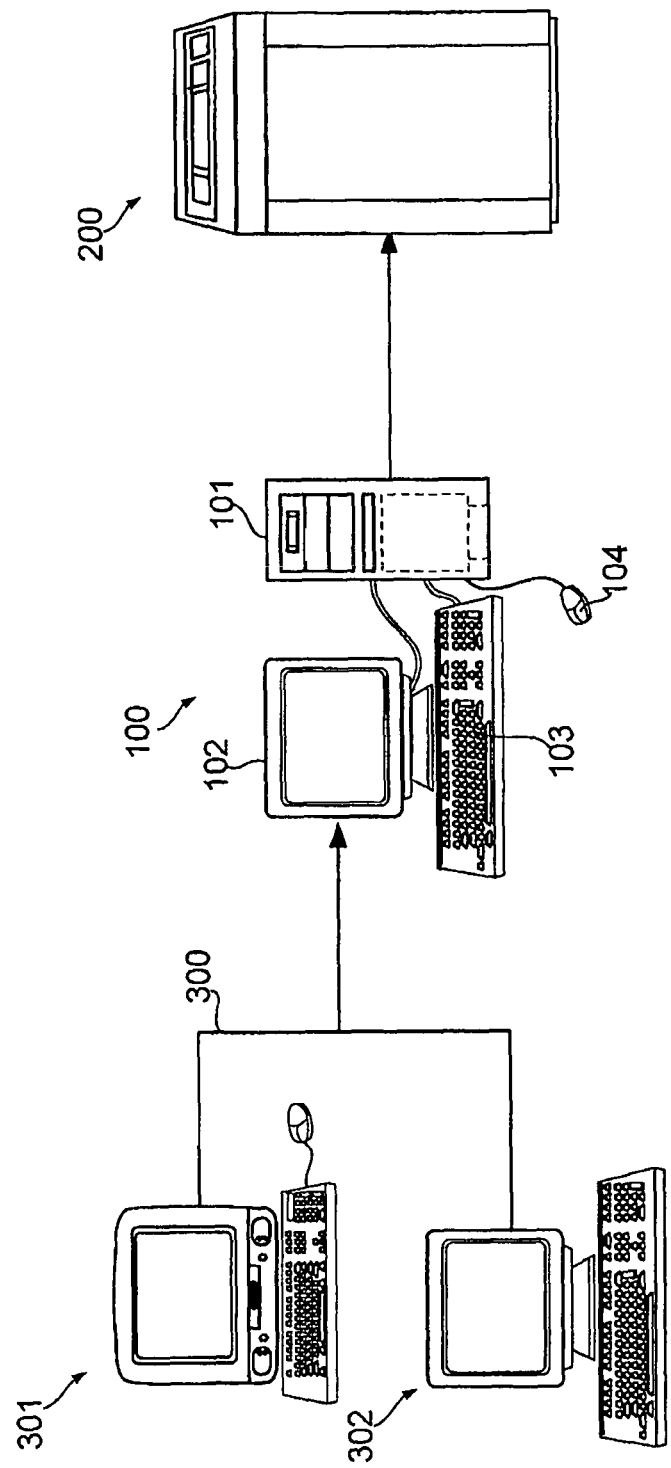
FIG. 1 is a diagram illustrating an RIP system incorporating an embodiment according to the present invention.

FIG. 1 is a diagram illustrating an RIP (Raster Image Processor) system incorporating one preferred embodiment according to the present invention.

FIG. 1 illustrates a computer constituting an editing apparatus 301 or 302, a computer constituting an RIP apparatus 100, and a printer 200.

Image data representing an image of each of pages constituting a printed matter is edited in the editing apparatus 301 or 302, to be then transmitted to the RIP apparatus 100 via a communication network 300.

The RIP apparatus 100 receives the image data from the editing apparatus 301 or 302, converts the image data into image data, for the printer 200, representing an image in which an image is expressed in raster data, and then, outputs it to the printer 200. Here, the image data may be received not only via the communication network 300 but also via a recording medium such as a CD (Compact Disc) or an MO (Magneto-Optical) disc and the like.

The printer 200 receives the image data transmitted from the RIP apparatus 100, and then, prints an image based on the image data.

A feature of the RPI system illustrated in FIG. 1 as one preferred embodiment according to the present invention resides in functions in the computer which operates as the RIP apparatus 100. In view of this, explanation will be made below while focusing attention on the RIP apparatus 100.

The RIP apparatus 100 illustrated in FIG. 1 is constituted of the computer, as described above. The computer includes: a main unit 101 incorporating therein a CPU, a main storage device, a hard disc, a communication board and the like; a display 102 which displays an image or a character string on a display screen in accordance with an instruction from the main unit 101; a keyboard 103 for inputting an instruction or character information from a user into the computer; and a mouse 104 which designates an arbitrary position on the display screen on the display 102, so as to input an instruction in accordance with an icon or the like displayed at the position.

In the main unit 101 houses a CD/DVD drive in which a CD 105 (illustrated in not FIG. 1 but FIG. 2) or a DVD is detachably loaded, which reproduces information stored in the loaded CD or DVD. In addition, in the main unit 101 is detachably loaded a magneto-optical disk (abbreviated to an MO) 106 (illustrated in not FIG. 1 but FIG. 2), and further, is incorporated an MO drive which records or reproduces information in or from the loaded MO 106.

Figure 2:
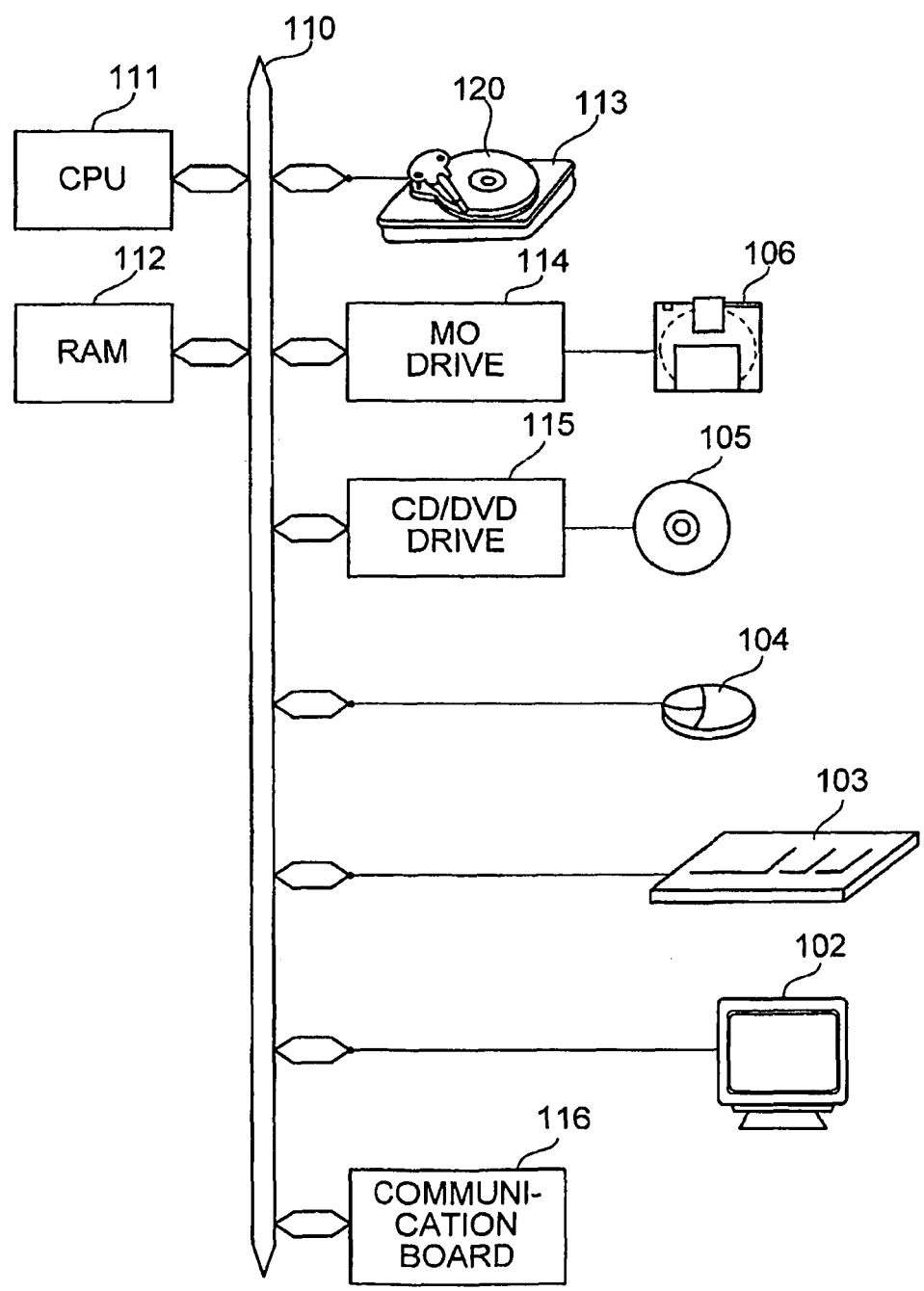
FIG. 2 is a diagram illustrating the hardware configuration of a computer constituting the RIP apparatus 100.

FIG. 2 is a diagram illustrating the hardware configuration of the computer constituting the RIP apparatus 100.

The hardware configuration diagram illustrates a CPU (Central Processing Unit) 111, a RAM 112, an HDD (Hard Disc Drive) 113, an MO drive 114, a CD/DVD drive 115, and a communication board 116, which are mutually connected via a bus 110.

The HDD 113 incorporates therein a hard disc 120 as one kind of recording medium, and thus, records or reproduces information to/from the hard disc 120.

The communication board 116 is connected to a communication network such as a LAN (Local Area Network). The RIP apparatus 100 illustrated in FIG. 1 can transmit or receive data to or from another computer system via the communication network 300 with which the RIP apparatus 100 is connected via the communication board 116, and can output image data to the printer 200.

FIG. 2 also illustrates the mouse 104, the keyboard 103, and the display 102 which are illustrated also in FIG. 1, and are connected to the bus 110 via each of a plurality of I/O interfaces which are not illustrated.

Here, an embodiment of the data conversion program according to the present invention is stored in the CD 105. When the CD 105 is loaded in the main unit 101, the data conversion program stored in the CD 105 is read by the CD/DVD drive 115, and then, is installed in the hard disk 120 via the bus 110.

When the data conversion program installed in the hard disk 120 is started, the data conversion program in the hard disk 120 is loaded in the RAM 112 to be executed by the CPU 111. When the embodiment of the data conversion program according to the present invention is started to be executed, the RIP apparatus 100 operates as the embodiment of the data conversion apparatus according to the present invention.

In FIG. 2, the CD 105 is exemplified as a computer-readable storage medium storing the data conversion program. However, the computer-readable storage medium storing the data conversion program according to the present invention is not limited to the CD, and other storage media such as an optical disk, an MO, a flexible disk (abbreviated to an FD) and a magnetic tape may be used. The data conversion program according to the present invention may be supplied directly to the computer via the communication network not via the storage medium.

Figure 3:
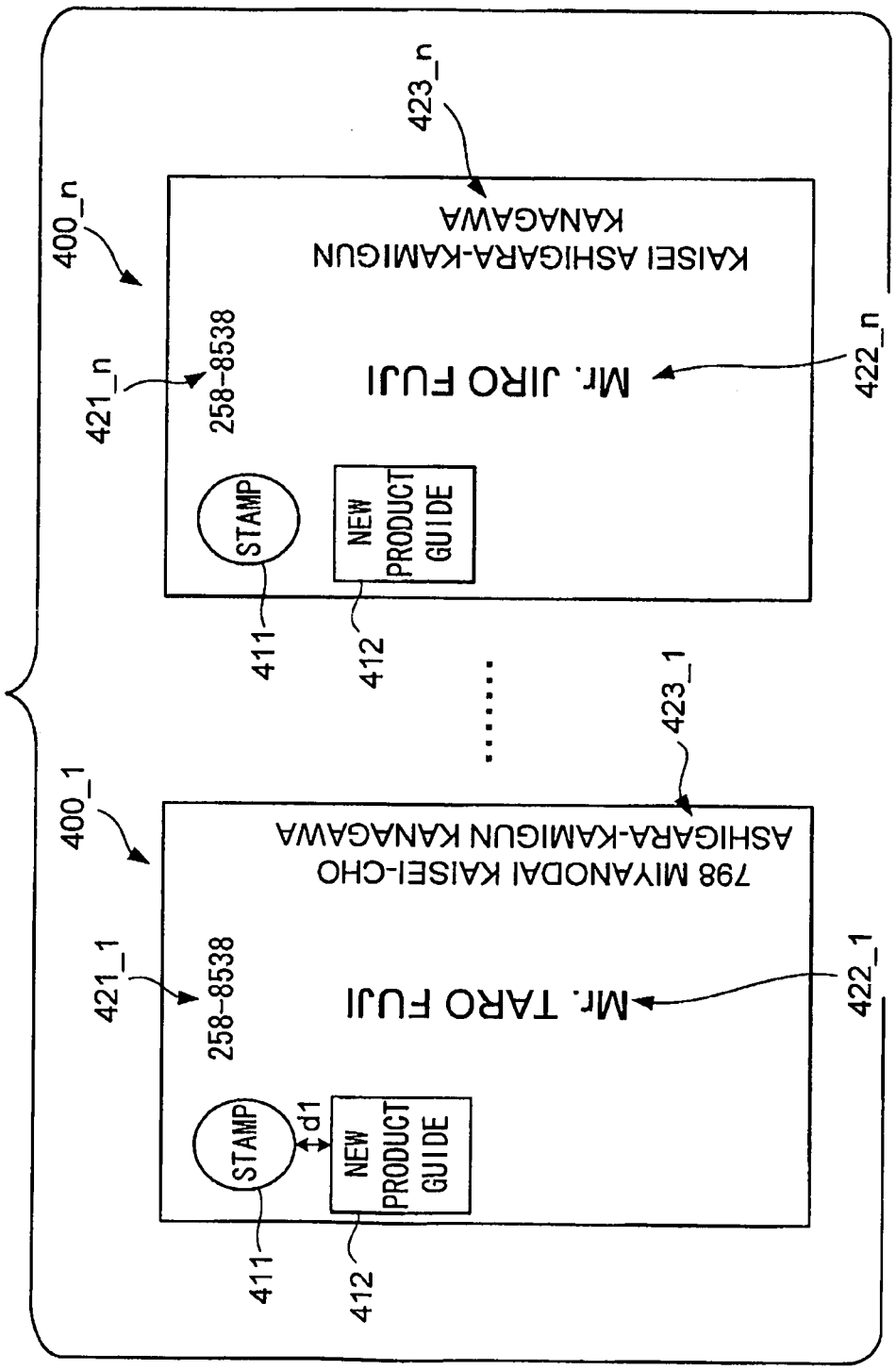
FIG. 3 illustrates variable printing.

FIG. 3 illustrates variable printing.

In FIG. 3, postcards 400_1, . . . , and 400_n created for plural destinations are illustrated as a printed matter by the variable printing are exemplified. Hereinafter, explanation will be made on the postcard 400_1 for a first destination representing the postcards 400_1, . . . , and 400_n. On the postcard 400_1 are arranged two master elements 411 and 412 of a stamp and a new product guide which are commonly used in the plural postcards 400_1 . . . , and 400_n, and three variable elements 421_1, 422_1, and 423_1, a zip code, a name, and an address which are individually used in each of the plurality of postcards 400_1, . . . , and 400_n.

In the present embodiment, DTP software to which PPML is applied is used in the editing apparatus 301 or 302 illustrated in FIG. 1 when the printed matter illustrated in FIG. 3 is created by the DTP software. Image data of a PPML format is produced in which the element data representing the master elements 411 and 412 is described once commonly in the plural postcards 400_1, . . . , and 400_n whereas the plural element data representing the variable elements 421_1, . . . , and 421_n, 422_1, . . . , and 422_n, and 423-1, . . . , and 423_n are described on each of pages 1, . . . , and n.

Basically, PPML is a data description language for describing the arrangement of the element and the like. The element data per se representing the element is prepared in a file other than a PPML file is described in, for example, the element is described in PS or PDF, or the element data described in PS or PDF is converted into an ASCII (American Standard Code for Information Interchange) text to be described.

Aside from the embodiment according to the present invention once, the explanation will be made on the data conversion apparatus disclosed in Japanese Patent Application Laid-open No. 2005-208925.

Figure 4:
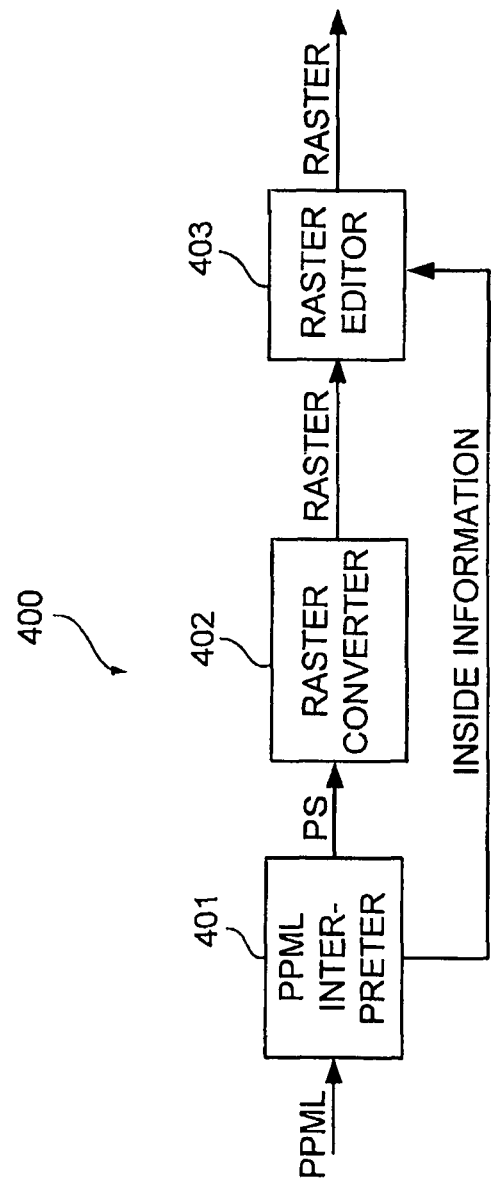
FIG. 4 is a functional block diagram illustrating a conventional data conversion apparatus.

FIG. 4 is a functional block diagram illustrating the conventional data conversion apparatus. The data conversion apparatus illustrated in FIG. 4 corresponds to a comparative example to be compared with the preferred embodiment according to the present invention.

The data conversion apparatus 400 is constructed inside in the RIP apparatus 100 in accordance with the program executed by the RIP apparatus 100 illustrated in FIG. 1, and is constituted of a PPML interpreter 401, a raster converter 402, and a raster editor 403.

Figure 5:
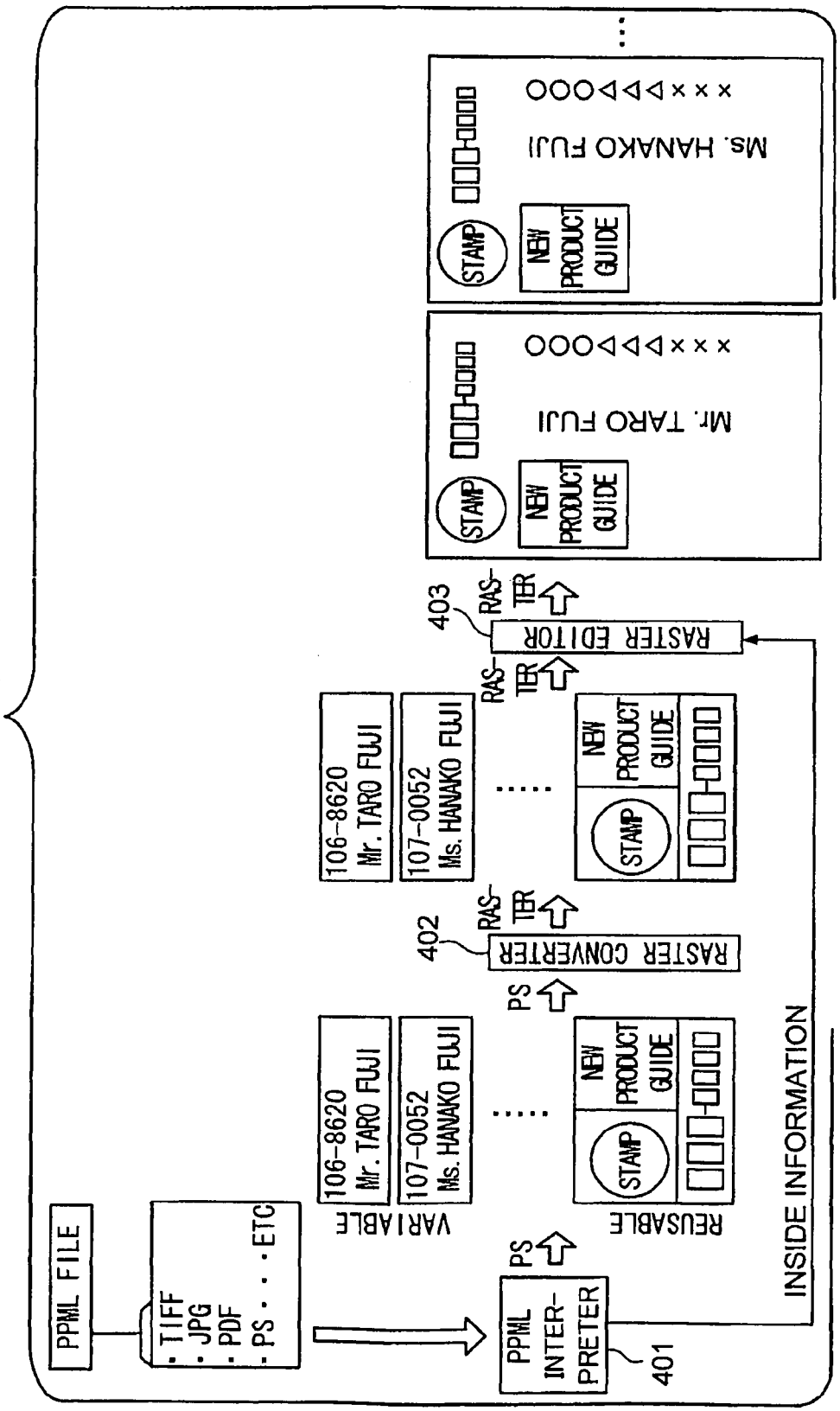
FIG. 5 is a diagram explanatory of the function of the conventional data conversion apparatus illustrated in the functional block diagram of FIG. 4.

FIG. 5 is a diagram explanatory of the function of the conventional data conversion apparatus illustrated in the functional block diagram of FIG. 4.

The PPML file described in the PPML from is input In the data conversion apparatus 400 illustrated in FIG. 4 (i.e., the RIP apparatus 100 illustrated in FIG. 1) from the editing apparatus 301 or 302 illustrated in FIG. 1, and the contents of the PPML file are interpreted by the PPML interpreter 401. In the PPML file, a file name or the like of the element data constituting a part of an image in various formats such as Tiff, JPEG, PDF, and PS is described in the PPML file, and further, an arrangement position or the like on the image of the image element specified by the file name is described.

The PPML interpreter 401 interprets the PPML file, collects the element data of the image, and then, converts the data format of each of the element data into the PS format, and thus, produces PS element data, and further, produces inside information representing the arrangement position or the like of each of the elements. Here, the PS element data includes PS element data of variable elements as the image elements different per page, PS element data of reusable elements as image elements commonly used in plural pages.

The PS element data is input into the raster converter 402, in which the data format is converted from the PS format to the raster format, and raster element data is produced.

In this stage, the raster element data is data divided per element of the image. Next, the raster element data is input into the raster editor 403. The inside information representing the arrangement position and the like of the image element obtained in the PPML interpreter 401 is also input in to the raster editor 403. In the raster editor 403, the raster element data received from the raster converter 402 is arranged in accordance with the inside information, to be edited to raster page data representing the image per page. The raster page data obtained in this manner is transmitted to the printer 200 illustrated in FIG. 1 so that a printed matter is created in accordance with the raster page data.

As illustrated in FIGS. 4 and 5, PPML is conventionally converted into raster data in the RIP apparatus 100 illustrated in FIG. 1, and the RIP apparatus 100 cannot determine as to whether or not a page need be printed, and therefore, the data edited as the PPML file in the editing apparatus 301 or 302 is printed as it is. Should the RIP apparatus 100 select a page to be printed by displaying the image before the printing, the raster data is quite large in amount of data in expressing the same image, thereby requiring much time in displaying or updating the image.

The explanation will be returned to the embodiment according to the present invention.

Figure 6:
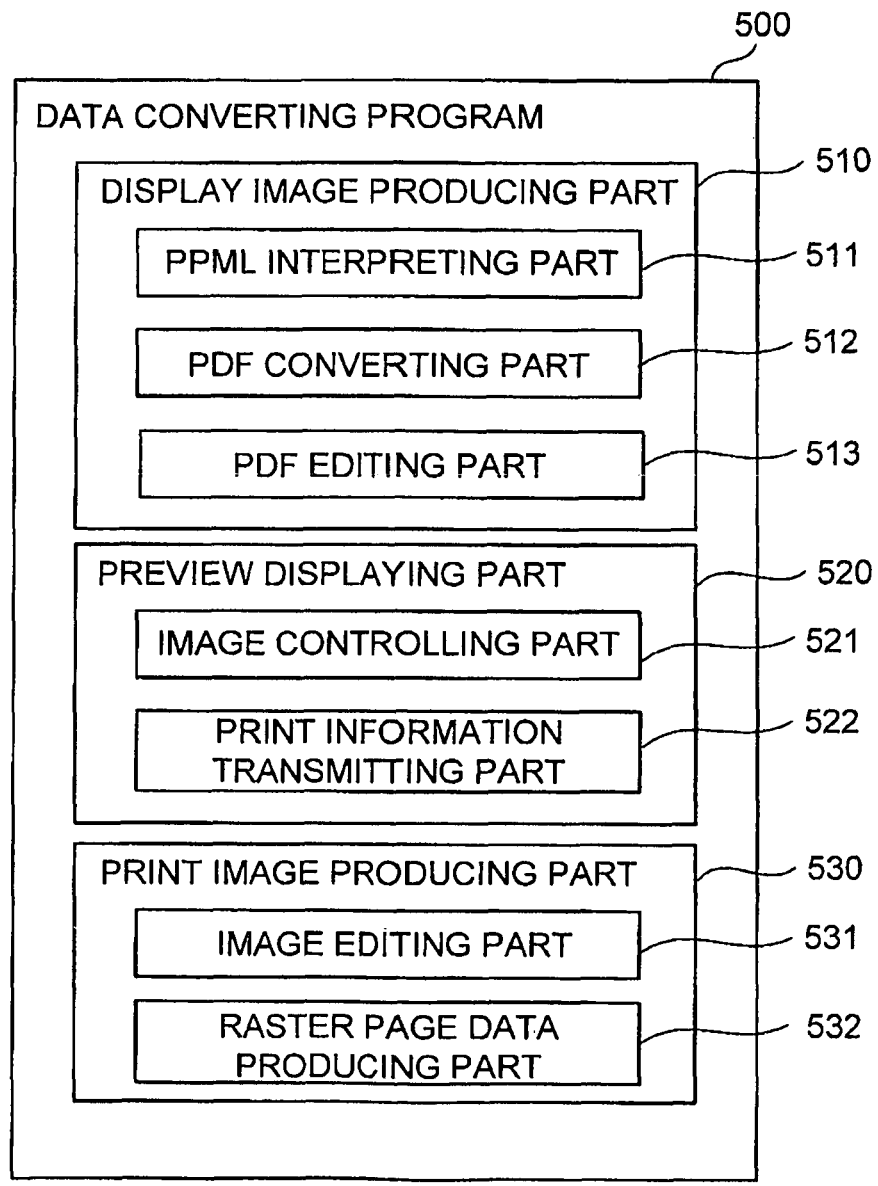
FIG. 6 is a diagram illustrating an outline of a data converting program as a first embodiment according to the present invention.

FIG. 6 is a diagram illustrating an outline of the data converting program in a first embodiment according to the present invention.

A data converting program 500 illustrated in FIG. 6 is a program to be executed in the RIP apparatus 100 illustrated in FIG. 1, and includes three program parts: a display image producing part 510, a preview displaying part 520, and a print image producing part 530. Here, the display image producing part 510 includes three program parts: a PPML interpreting part 511, a PDF converting part 512, and a PDF editing part 513. Furthermore, the preview displaying part 520 includes two program parts: an image controlling part 521 and a print information transmitting part 522. Moreover, the print image producing part 530 includes two program parts: an image editing part 531 and a raster page data producing part 532. The function of each of the program parts will be explained together with the explanation of a data converting apparatus 600 illustrated in FIG. 7.

FIG. 7 is a functional block diagram illustrating an outline of a data converting apparatus in a first embodiment according to the present invention.

A data converting apparatus 600 illustrated in FIG. 7 includes a display image producing section 610, a preview displaying section 620, and a print image producing section 530. Here, the display image producing section 610 includes a PPML interpreter 611; a PDF converter 612, and a PDF editor 613. Furthermore, the preview displaying section 620 includes an image controller 621 and a print information transmitter 622. Moreover, the print image producing section 630 includes an image editor 631 and a raster page data producer 632. The sections included in the data converting apparatus 600 illustrated in FIG. 7 correspond to the program parts having the same names and included in the data converting program illustrated in FIG. 6, respectively. Here, the sections as the program parts illustrated in FIG. 6 indicate only software: in contrast, the sections illustrated in FIG. 7 indicate the functions implemented in the RIP apparatus 100 when the program parts illustrated in FIG. 6 are executed in the RIP apparatus 100, that is, a composite of the hardware in the RIP apparatus 100 and the program parts illustrated in FIG. 6.

Hereinafter, the explanation of the functions of the sections in the data converting apparatus illustrated in FIG. 7 encompasses an explanation of the program parts of the data converting program illustrated in FIG. 6.

A PPML file, which is described in PPML and consists of one or more records, each having print data on one or more pages described therein, is input into the data converting apparatus 600 illustrated in FIG. 7 from the editing apparatus 301 or 302 illustrated in FIG. 1. And then, the contents of the PPML file are interpreted in the PPML interpreter 611. That is to say, the PPML interpreter 611 is similar to the PPML interpreter 401 constituting the conventional data converting apparatus 400 illustrated in FIG. 4, and the PPML interpreter 611 receives the PPML file described in the PPML data to produce PS element data in which an image element is described in the PS data and inside information representing the arrangement position within the page, of the image element expressed in the PS element data.

The PS element data obtained in the PPML interpreter 611 is input into the PDF converter 612. In the PDF converter 612, the PS element data produced in the PPML interpreter 611 is converted into PDF element data in which the same element as the image element expressed in the PS element data is expressed in the PDF data. In other words, the conventional data converting apparatus 400 is provided with the raster converter 402 and the PS element data obtained in the PPML interpreter 401 is converted into the raster element data. In contrast, the data converting apparatus 600 illustrated in FIG. 7 is provided with the PDF converter 612, and the PS element data obtained in the PPML interpreter 611 is converted into the PDF element data, that is, the element data in PDF. Furthermore, the display image producing section 610 constituting the data converting apparatus 600 illustrated in FIG. 7 is provided with the PDF editor 613 which edits the PDF element data obtained in the PDF converter 612 based on the inside information produced in the PPML interpreter 611, so as to produce image data expressing an image per page, described in the PDF data. A flow of the data conversion in the display image producing section 610 corresponds to that in the conventional data converting apparatus 400 in which the raster converter 402 and the raster editor 403 in FIG. 5 are replaced with the PDF converter 612 and the PDF editor 613, respectively. In other words, the explanation with reference to FIG. 5 is applied to the data converting apparatus 600 except that the data is converted to not the raster format but the PDF format.

The image data in the PDF obtained by the display image producing section 610 illustrated in FIG. 7 is input into the preview displaying section 620. The image controller 621 in the preview displaying section 620 produces a screen including a list display field, an image display field, and an operation field, and then, displays it. In the list display field is displayed a list of thumbnail images based on the image data of one or more pages constituting a designated record out of displaying image data produced in the display image producing section 610. In the image display field is displayed an image of one page designated by a user operation from the list of the thumbnail images displayed in the list display section. In the operation field is designated as to which record in the thumbnail image displayed in the list display section is designated, whether or not the images of one or more pages constituting the record represented by the thumbnail image displayed in the list display section need be printed, and whether or not the image of one page displayed in the image display section need be printed. Here, the image controller 621 displays a list of thumbnail images of a newly designated record in the list display section in accordance with the designation of the record by a user, and further, displays an image of one new page corresponding to the thumbnail image newly designated in the image display field in accordance with the new designation of one out of the thumbnail images displayed in the list display section by the user. The preview displaying section 620 will be further explained later with reference to a screen example.

The preview displaying section 620 further includes the print information transmitter 622 which fulfills the function of transmitting information on record or page to be printed to the print image producing section 630 upon receipt of the designation by the user whether or not the printing need to be performed per record or page.

Additionally, the print image producing section 630 includes the image editor 631 and the raster page data producer 632. The image editor 631 receives the image data described in the PDF data from the display image producing section 610, and further, receives the information on the record or page to be printed from the preview displaying section 620, and then, deletes image data not required to be printed out of the image data received from the display image producing section 610, so as to edit the image data to be printed. The raster page data producer 632 converts the image data edited in the image editor 631 into raster page data which consists of raster data and expresses an image per page.

Hereinafter, explanation will be made in more detail on the function of the data converting apparatus 600 illustrated in FIG. 7.

FIG. 8 exemplifies the PPML file.

In the PPML file illustrated in FIG. 8, a part (a) is a description of a reusable element; and parts (b), (c), and (d) are descriptions of variable elements of a first record, a second record, and a third record, respectively. Moreover, parts (b-1), (b-2), and (b-3), (c-1), and (d-1) and (d-2) are respective descriptions of pages. Specifically, in an example illustrated in FIG. 8, the first record (b) includes three pages (b-1), (b-2), and (b-3); the second record (c) includes one page (c-1); and the third record (d) includes two pages (d-1) and (d-2).

A description on a fifth line of the reusable element (a) signifies that data is to be acquired from a first page in Reusable1.pdf; a description on a ninth line signifies that the reusable element is to be registered in the name of REUSE__00001; and a description on an eleventh line signifies that data in a rectangular region defined by (0,486.96)-(283,906.96) out of reference data is effective.

Moreover, a description on an 18th line of the first record (b) signifies that the record consists of three-pages and has information of Mr. A Info; and another description on a 20th line signifies that a region from (0,0) to (1275,906.96) is effective in the page (b-1).

Additionally, descriptions on 21st to 23rd lines signify that the reusable element of REUSE__00001 is arranged at (28.3465,-28.3465); and other descriptions on 24th to 34th lines signify that data of test.jpg is subjected to a matrix for expansion/contraction or parallel movement, to be arranged at (255.12,42.244).

A description on a second page onward is omitted.

In addition, a description on a 45th line of the second record (c) signifies that the record (c) includes one page and has information of Mr. B Info; and another description on a 52nd line of the third record (d) signifies that the record (d) includes two pages and has information of Mr. C Info.

Figure 9:
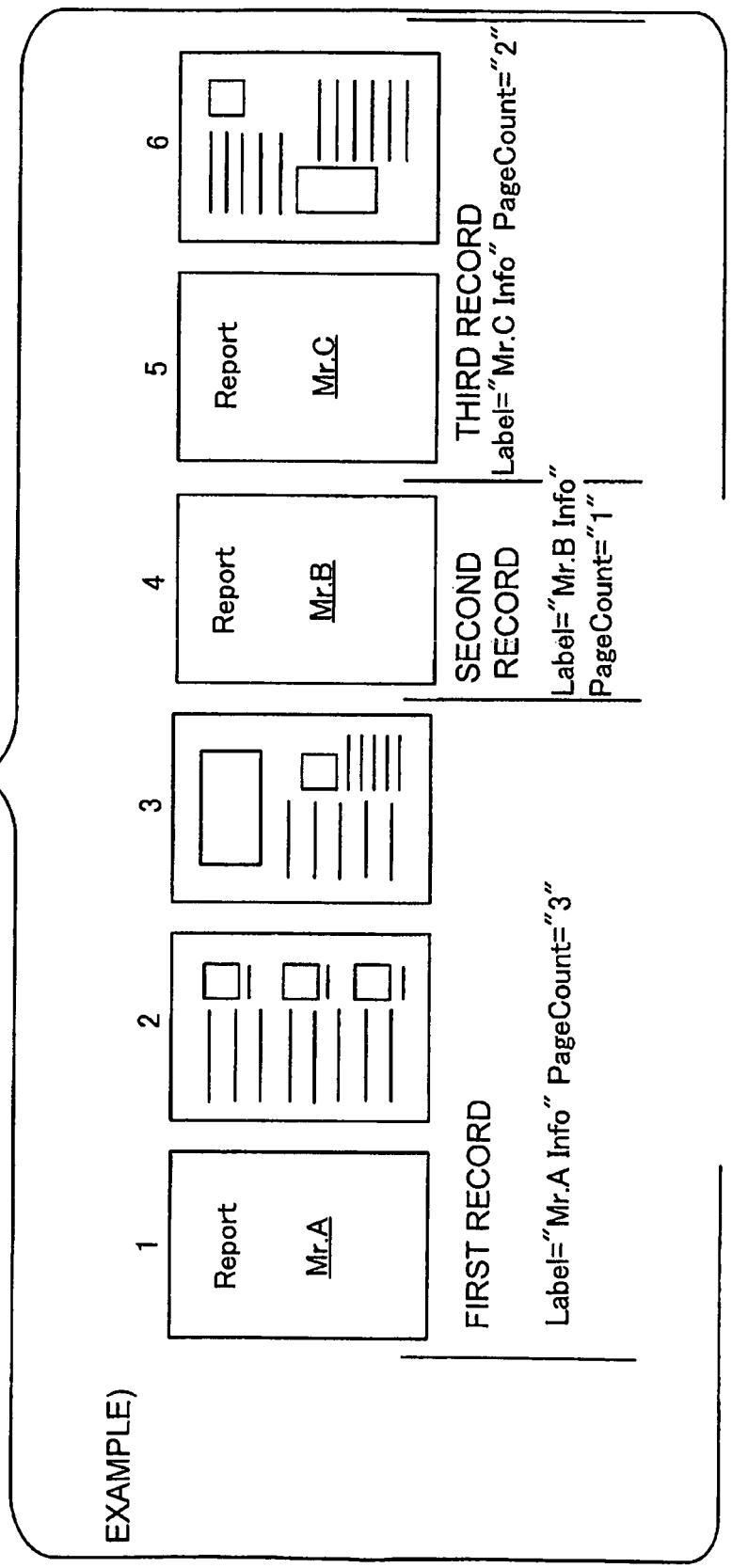
FIG. 9 illustrates images described in the PPML file illustrated in FIG. 8.

FIG. 9 illustrates images described in the PPML file illustrated in FIG. 8.

The first record is labeled as "Mr. A Info" and includes three pages; the second record is labeled as "Mr. B Info" and includes one page; and the third record is labeled as "Mr. C Info" and includes two pages. Here, the total number of pages is 6.

Figure 10:
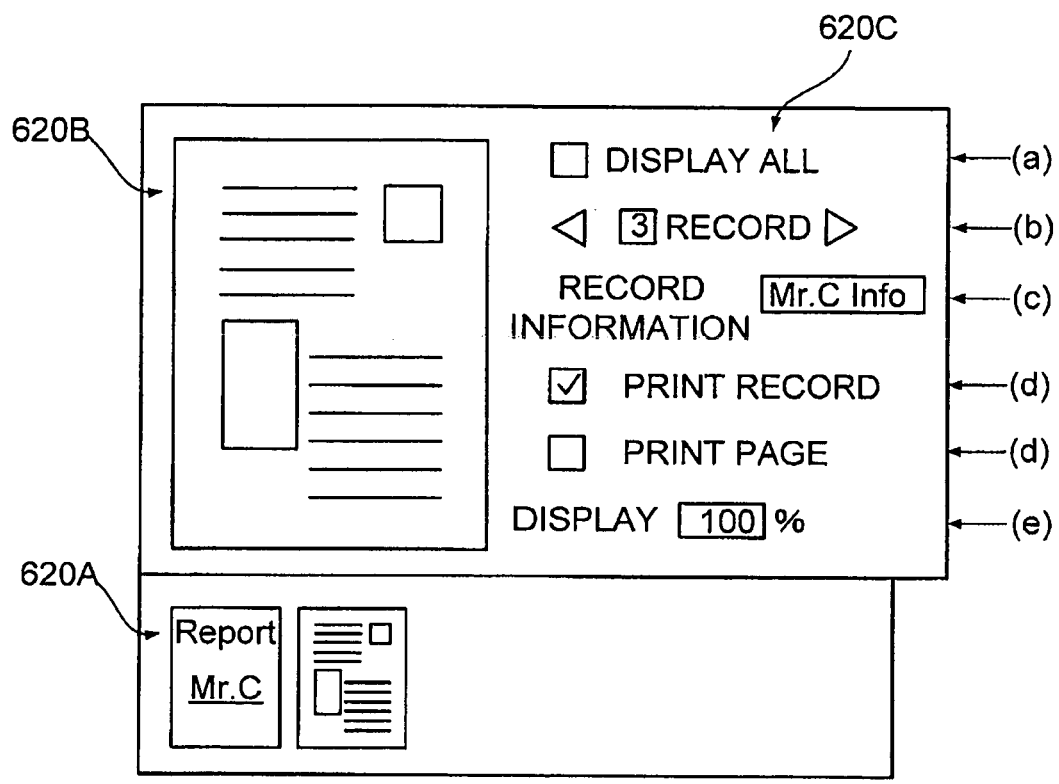
FIG. 10 is a diagram illustrating one example of a preview screen displayed in the preview displaying section in the data converting apparatus illustrated in FIG. 7.

FIG. 10 is a diagram illustrating one example of a preview screen displayed in the preview displaying section 620 in the data converting apparatus 600 illustrated in FIG. 7.

The preview screen includes a list display section 620A, an image display section 620B, and an operation section 620C.

In the list display section 620A is displayed a list of images illustrated in FIG. 9 or a list of images constituting a designated record. When "display all" is designated in item (a) in the operation field 620C, a list of thumbnails images of all pages constituting all of the records is displayed in the list display field 620A. When the record is designated in item (b) in the operation field 620C, a list of the images of all of the pages constituting the designated record is displayed in the list display field 620A. In FIG. 10, "third record" is designated, and therefore, the thumbnail images of two pages constituting the third record out of the images of six pages illustrated in FIG. 9 are displayed in the list display field 620A. Moreover, the name "Mr. C Info" labeled to the third record is displayed in item (c) in the operation field 620C.

When any one of the thumbnail images arranged in the list display field 620A is clicked by the mouse, the image for one page clicked by the mouse is displayed in the image display field 620B. In FIG. 10, the thumbnail image of a latter page out of the images for two pages constituting the third record is clicked, and therefore, the same image as the clicked thumbnail image is displayed in enlargement in the image display field 620B.

Moreover, when "PRINT RECORD" is designated in item (d) in the operation field 620C, printing of the record (here, the third record) corresponding to the thumbnail image listed up in the list display field 620A is instructed, and, when "PRINT PAGE" is designated in item (d) in the operation field 620C, printing of the page of the image displayed currently in the image display field 620B is instructed.

The magnification or reduction scale of the image displayed in the image display field 620B is designated in item (e) in the operation field 620C.

Here, when the change of the record in which the thumbnail images are listed up in the list display field 620A is instructed by the user operation, the list of the thumbnail images of all of the pages constituting the record changed by the instruction is displayed in the list display field 620A, and then, an image of a first page in the record is displayed in the image display field 620B.

The information as to whether or not the printing designated by the user is required, as explained above, is transmitted to the print image producing section 630 illustrated in FIG. 7. In the print image producing section 630, data on a page not required to be printed is deleted from the PDF image data on all of the pages received from the display image producing section 610, and then, only a page to be printed is converted into the raster page data, as explained above. The raster page data such obtained as explained above is transmitted to the printer 200 (see FIG. 1), and a printed matter is created based on the raster page data.

Here, the display image producing section 610 converts the data into the image data in PDF, as explained above. Therefore, the amount of the image data is smaller in comparison with a raster page. Thus, the image can be displayed at a high speed in the preview displaying section 620, and further, designation as to whether or not printing is required can be instructed with good workability.

Figure 11:
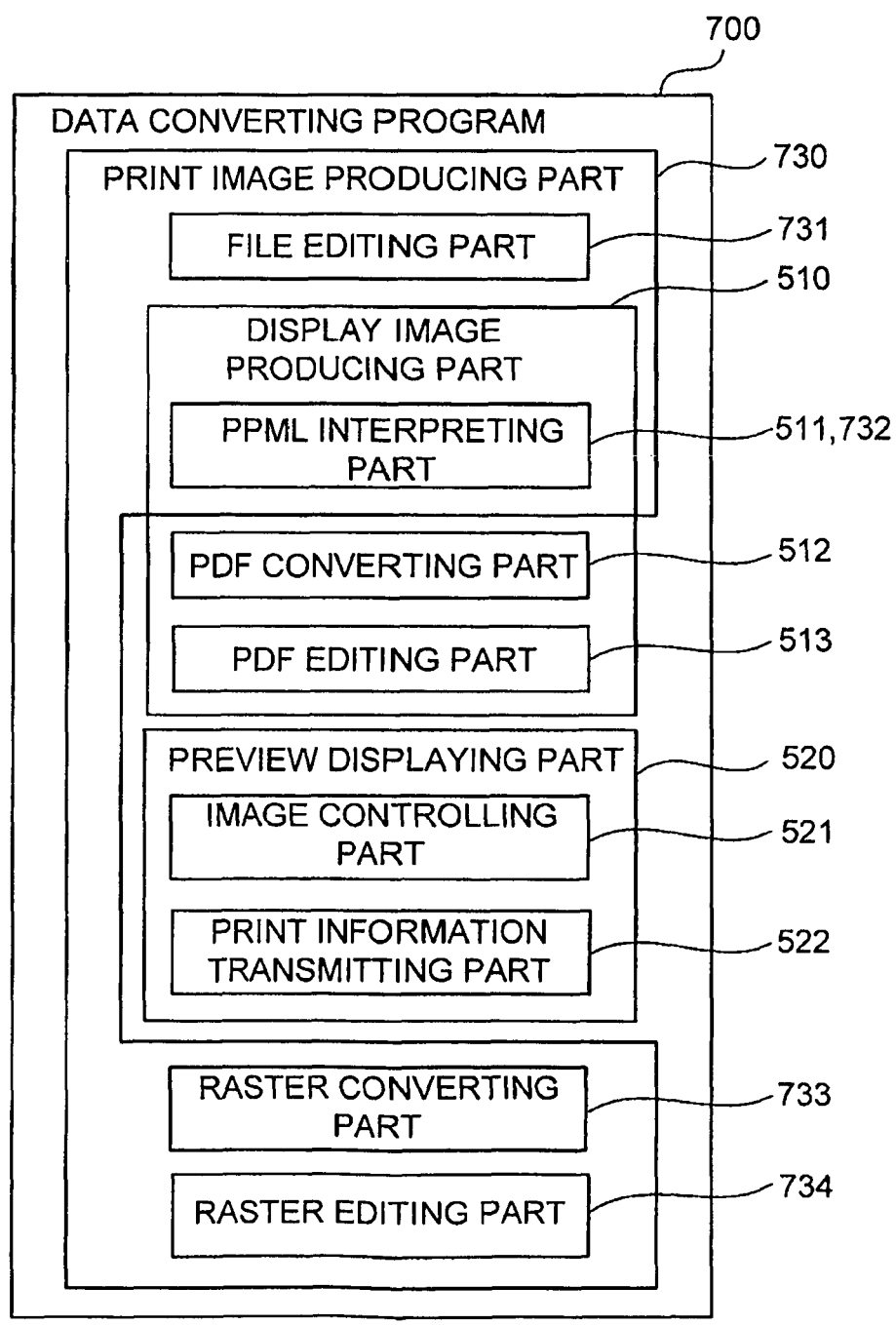
FIG. 11 is a diagram illustrating an outline of a data converting program as a second embodiment according to the present invention.

FIG. 11 is a diagram illustrating an outline of a data converting program in a second embodiment according to the present invention.

In FIG. 11, the same program parts as those included in the data converting program in the first embodiment illustrated in FIG. 6 are denoted by the same reference numerals, and differences will be explained below.

A display image producing section 510 and a preview displaying section 520 out of the program parts included in a data converting program 700 illustrated in FIG. 11 are identical to the display image producing section 510 and the preview displaying section 520 out of the program parts included in the data converting program 500 illustrated in FIG. 6.

The data converting program 700 illustrated in FIG. 11 includes a print image producing part 730 different in configuration from the print image producing part 530 as one of the program parts included in the data converting program 500 illustrated in FIG. 6. The print image producing part 730 includes a file editing part 731, a PPML interpreting part 732, a raster converting part 733, and a raster editing part 734. Here, the PPML interpreting part 732 also serves as a PPML interpreting part 511 included in the display image producing section 510 in the present embodiment.

Figure 12:
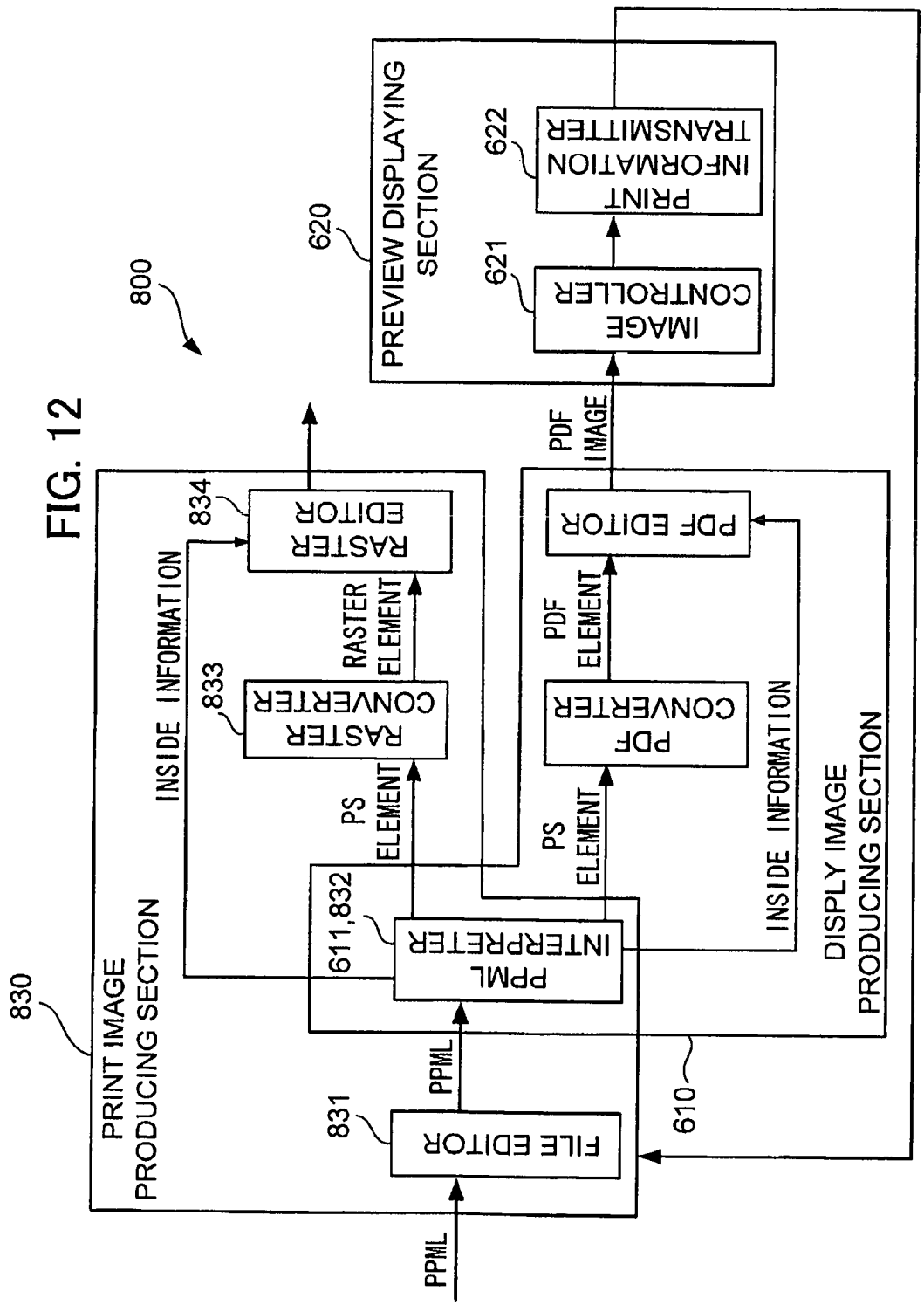
FIG. 12 is a functional block diagram illustrating a outline of a data converting apparatus as the second embodiment according to the present invention Parts (A) and (B) of FIG. 13 illustrate the processing in the file editor.

FIG. 12 is a functional block diagram illustrating an outline of a data converting apparatus in the second preferred embodiment according to the present invention.

Sections included in a data converting apparatus 800 illustrated in FIG. 12 correspond to the program parts having the same names as those in FIG. 12 of the program parts included in the data converting program 700 illustrated in FIG. 11, respectively. Here, the program parts illustrated in FIG. 11 designate only software: in contrast, the sections illustrated in FIG. 12 indicate the functions implemented in the RIP apparatus 100 (see FIG. 1) when the program parts illustrated in FIG. 11 are executed in the RIP apparatus 100, that is, a composite of the hardware in the RIP apparatus 100 and the program parts illustrated in FIG. 11.

As a consequence, a display image producing section 610 and a preview displaying section 620 included in the data converting apparatus 800 illustrated in FIG. 12 are identical to the display image producing section 610 and the preview displaying section 620 included in the data converting apparatus 600 in the first preferred embodiment illustrated in FIG. 7.

Unlike the print image producing section 630 included in the data converting apparatus 600 illustrated in FIG. 7, a print image producing section 830 includes a file editor 831, a PPML interpreter 832, a raster converter 833, and a raster editor 834. In the present preferred embodiment, the PPML interpreter 832 also serves as a PPML interpreter 611 included in the display image producing section 610.

Into the data converting apparatus 800 is input a PPML file, for example, illustrated in FIG. 8 from the editing section 301 or 302 illustrated in FIG. 1. The input PPML file is stored in the file editor 831 for a subsequent processing in a stage in which an image is displayed on the preview displaying section 620, and further, passes by the file editor 831, and then, is input into the PPML interpreter 611 as it is. In the display image producing section 610, data is converted into PDF image data, similar to the first embodiment explained with reference to FIG. 7. Moreover, in the preview displaying section 620, an image before printing is displayed, and then, whether or not printing is required is instructed, also similar to the first embodiment explained with reference to FIG. 7.

Information as to whether or not printing per record or page is required in the preview displaying section 620 is transmitted to the file editor 831 included in the print image producing section 830. In the file editor 831, the PPML file stored in the stage of the preview display is edited in accordance with the information as to whether or not printing is required received from the preview displaying section 620, and then, is transferred to the PPML interpreter 832.

Figure 13:
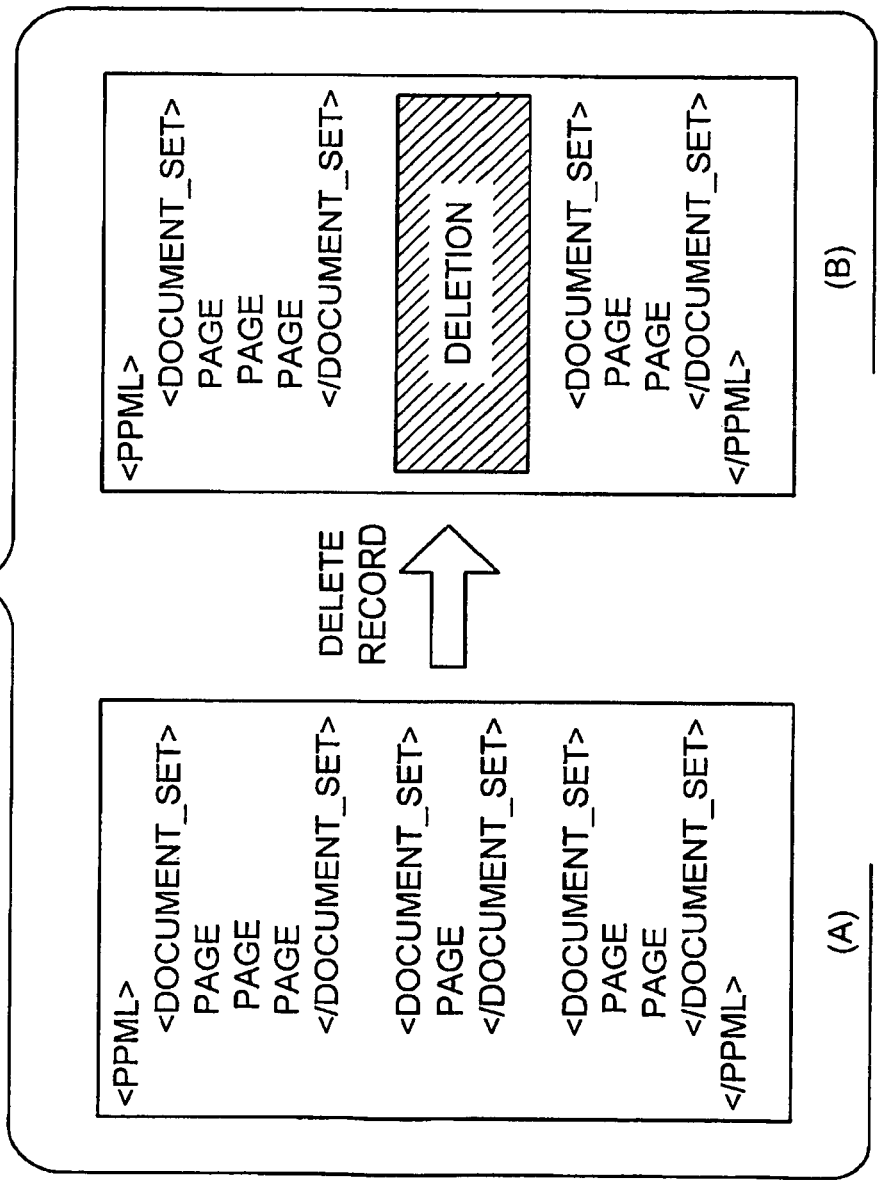

Parts (A) and (B) of FIG. 13 illustrate the processing in the file editor.

Part (A) of FIG. 13 simplifies the PPML file illustrated in FIG. 8. Here, the preview displaying section 620 is assumed to be instructed that only the first and third records are printed whereas the second record is not printed. Upon receipt of the information as to whether or not printing is required, the description of the second record is deleted from the PPML file in the file editor 831, and then, a new PPML file is produced, as illustrated in part (B) of FIG. 13.

Returning to FIG. 12, the explanation is continued.

In the stage of the printing, the PPML file newly produced as explained above is transferred from the file editor 831 to the PPML interpreter 832. The subsequent flow of data conversion in the PPML interpreter 832, the raster converter 833, and the raster editor 834 is identical to that of the data conversion in the conventional data converting apparatus 400 illustrated in FIG. 4. That is to say, PS element data and inside information are produced in the PPML interpreter 832 based on the contents of the PPML file received from the file editor 831, as illustrated in FIG. 12. The PS element data is input into the raster converter 833, to be then converted into raster element data which is then input into the raster editor 834. The raster editor 834 edits the raster element data based on the inside information received from the raster converter 831, thereby producing raster page data. The raster page data is transmitted to the printer 200 illustrated in FIG. 1, and then, printing is performed in accordance with the raster page data.

In the above-described first embodiment, a so-called PDFRIP is needed for converting the PDF data into the raster data. The PS data is converted into the raster data in the prior art. With the configuration in the second preferred embodiment, a user having such equipment can construct a system which can make designation as to whether or not printing is required by the preview display, so as to print only necessary pages even without newly preparing a PDF RIP.

What is claimed is:

1. A data converting apparatus, comprising:
    a display image producing section that receives a file including one or more records each comprising descriptions of print data for one or more pages, and that produces image data for display based on the file;
    a preview displaying section that displays an image based on the image data produced by the display image producing section, and that receives a designation by a user operation as to a record or page in the file to be printed; and
    a print image producing section that produces image data for printing with respect to the record or page designated to be printed in the designation received by the preview displaying section,
    wherein the display image producing section includes:
    a first PPML interpreter that receives the file described in a PPML data format and produces i) a first page description element data in which an element of the image is described in a page description language data format, and ii) first inside information representing an arrangement position, within a page, of the element expressed by the first element data;
    a PDF converter that converts the first element data produced by the first PPML interpreter into PDF element data in which the same element as the element expressed by the first element data is expressed in a PDF data format; and
    a PDF editor that edits the PDF element data obtained by the PDF converter based on the first inside information produced by the first PPML interpreter, and that produces the image data for display, the image data representing the image on a page basis and described in the PDF data format, and wherein the print image producing section includes:
  a file editor that receives the file described in a PPML data format, that receives from the preview displaying section information on the record or page which is designated to be printed in the designation, and that automatically produces a new file described in a PPML data format by automatically deleting file portions of the received file describing print data for other records or pages in the received file that are not designated to be printed in the designation;
  a second PPML interpreter that receives the new file produced by the file editor, and that produces second page description element data and second inside information representing an arrangement position, within a page, of the element expressed by the second element data;
  a raster converter that converts the second element data produced by the second PPML interpreter into raster element data in which a same element as the element expressed by the second element data is expressed in a raster data format; and
  a raster data editor that edits the raster element data obtained by the raster converter based on the second inside information produced by the second PPML interpreter, and that produces raster page data representing the image in the designated record or page on a page basis.

2. The data converting apparatus according to claim 1, wherein the preview displaying section includes:
  an image controller that produces and displays a screen including: i) a list display field for displaying a list of thumbnail images based on an image data portion, for one or more pages included in a record in the file selected by a user operation for preview, of the image data for displaying produced by the display image producing section, ii) an image display field that, in use, displays an image for one page in the selected record corresponding to a thumbnail image selected by a user operation from among the list of thumbnail images displayed in the list display field, and iii) an operation field for selecting for preview the record corresponding to the list of thumbnail images displayed in the list display field and for designating the record corresponding to the list of thumbnail images in the list display field or the one page corresponding to the image displayed in the image display field as a record or page to be printed, that displays, when the user selects another record in the file for a preview, another list of thumbnail images corresponding to the another record in the list display field, and that displays, when the user newly selects a thumbnail image from among the another list of thumbnail images, an image for one page in the another record corresponding to the newly selected thumbnail image; and
  a print information transmitter that transmits, when a record or page is designated to be printed in the operation field, information on the designated record or page to the print image producing section.

3. A non-transitory computer-readable storage medium having stored thereon a data converting program executable in an information processing apparatus comprising a CPU, a memory, and a data reading/storage device, the information processing apparatus to operate as:
  a display image producing section that receives a file including one or more records each comprising descriptions of print data for one or more pages, and that produces image data for display based on the file;
  a preview displaying section that displays an image based on the image data produced in the display image producing section, and that receives a designation by a user operation as to a record or page in the file to be printed; and
  a print image producing section that produces image data for printing with respect to the record or page designated to be printed in the designation received by the preview displaying section,
wherein the display image producing section includes:
  a first PPML interpreter that receives the file described in a PPML data format and produces i) a first page description element data in which an element of the image is described in a page description language data format, and ii) first inside information representing an arrangement position, within a page, of the element expressed by the first element data;
  a PDF converter that converts the first element data produced by the first PPML interpreter into PDF element data in which the same element as the element expressed by the first element data is expressed in a PDF data format; and
  a PDF editor that edits the PDF element data obtained by the PDF converter based on the first inside information produced by the first PPML interpreter, and that produces the image data for display, the image data representing the image on a page basis and described in the PDF data format, and
wherein the print image producing section includes:
  a file editor that receives the file described in a PPML data format, that receives from the preview displaying section information on the record or page which is designated to be printed in the designation, and that automatically produces a new file described in a PPML data format by automatically deleting file portions of the received file describing print data for other records or pages in the received file that are not designated to be printed in the designation;
  a second PPML interpreter that receives the new file produced by the file editor, and that produces second page description element data and second inside information representing an arrangement position, within a page, of the element expressed by the second element data;
  a raster converter that converts the second element data produced by the second PPML interpreter into raster element data in which a same element as the element expressed by the second element data is expressed in a raster data format; and
  a raster data editor that edits the raster element data obtained by the raster converter based on the second inside information produced by the second PPML interpreter, and that produces raster page data representing the image in the designated record or page on a page basis.

4. The data converting program according to claim 3, wherein the preview displaying section includes:
  an image controller that produces and displays a screen including: i) a list display field for displaying a list of thumbnail images based on an image data portion, for one or more pages included in a record in the file selected by a user operation for a preview, of the image data for displaying produced by the display image producing section, ii) an image display field that, in use, displays an image for one page in the selected record corresponding to a thumbnail image selected by a user operation from among the list of thumbnail images displayed in the list display field, and iii) an operation field for selecting for preview the record corresponding to the list of thumbnail images displayed in the list display field and for designating the record corresponding to the list of thumbnail images in the list display field or the one page corresponding to the image displayed in the image display field as a record or page to be printed, that displays, when the user selects another record in the file for a preview, another list of thumbnail images corresponding to the another record in the list display field, and that displays, when the user newly selects a thumbnail image from among the another list of thumbnail images, an image for one page in the another record corresponding to the newly selected thumbnail image; and a print information transmitter that transmits, when a record or page is designated to be printed in the operation field, information on the designated record or page to the print image producing section.

5. A method for converting image data, comprising the steps of:

receiving, at a display image producing unit, a file including one or more records each comprising descriptions of print data for one or more pages, and producing image data for display based on the file received in the receiving step;

displaying, at a preview displaying unit, an image based on the image data produced by the producing step, and receiving a designation by a user operation as to a record or page in the file to be printed; and producing, at a print image producing unit, image data for printing with respect to the record or page designated to be printed in the designation received in the receiving step, wherein the displaying step includes the sub-steps of:

receiving, at a first PPML interpreter, the file described in a PPML data format, and producing, at a i) first page description element data in which an element of the image is described in a page description language data format, and ii) first inside information representing an arrangement position, within a page, of the element expressed by the first element data;

converting the first element data produced by the first PPML interpreter into PDF element data in which the same element as the element expressed by the first element data is expressed in a PDF data format; and editing the PDF element data based on the first inside information produced by the first PPML interpreter, and producing the image data for display, the image data representing the image on a page basis and described in the PDF data format, and wherein the producing step includes the sub-steps of:

receiving the file described in a PPML data format and receiving information on the record or page which is designated to be printed in the designation and automatically producing a new file described in a PPML data format by automatically deleting file portions of the received file describing print data for other records or pages in the received file that are not designated to be printed in the designation;

receiving, at a second PPML interpreter, that receives the new file produced by the file editor, and producing second page description element data and second inside information representing an arrangement position, within a page, of the element expressed by the second element data;

converting the second element data produced by the second PPML interpreter into raster element data in which a same element as the element expressed by the second element data is expressed in a raster data format; and editing the raster element data based on the second inside information produced by the second PPML interpreter, and producing raster page data representing the image in the designated record or page on a page basis.

6. The method according to claim 5, wherein the displaying step includes the sub-steps of:

producing and displaying a screen including: i) a list display field for displaying a list of thumbnail images based on an image data portion, for one or more pages included in a record in the file selected by a user operation for preview, of the image data for displaying produced by the display image producing unit, ii) an image display field that, in use, displays an image for one page in the selected record corresponding to a thumbnail image selected by a user operation from among the list of thumbnail images displayed in the list display field, and iii) an operation field for selecting for preview the record corresponding to the list of thumbnail images displayed in the list display field and for designating the record corresponding to the list of thumbnail images in the list display field or the one page corresponding to the image displayed in the image display field as a record or page to be printed, that displays, when the user selects another record in the file for a preview, another list of thumbnail images corresponding to the another record in the list display field, and that displays, when the user newly selects a thumbnail image from among the another list of thumbnail images, an image for one page in the another record corresponding to the newly selected thumbnail image; and transmitting, when a record or page is designated to be printed in the operation field, information on the designated record or page to the print image producing unit.

* * * * *